United States Patent
Kitajima et al.

(10) Patent No.: US 9,686,149 B2
(45) Date of Patent: Jun. 20, 2017

(54) INFORMATION PROCESSING SYSTEM, RELAY DEVICE, AND INFORMATION PROCESSING METHOD

(71) Applicant: FUJITSU LIMITED, Kawasaki-shi, Kanagawa (JP)

(72) Inventors: Shinya Kitajima, Inagi (JP); Yasuhide Matsumoto, Kawasaki (JP); Shinji Kikuchi, Yokohama (JP); Yukihiro Watanabe, Kawasaki (JP); Fumi Iikura, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 301 days.

(21) Appl. No.: 13/962,302

(22) Filed: Aug. 8, 2013

(65) Prior Publication Data
US 2014/0059197 A1 Feb. 27, 2014

(30) Foreign Application Priority Data
Aug. 22, 2012 (JP) ................. 2012-183642

(51) Int. Cl.
*G06F 15/173* (2006.01)
*H04L 12/24* (2006.01)

(52) U.S. Cl.
CPC ............ *H04L 41/50* (2013.01); *H04L 41/084* (2013.01); *H04L 41/0813* (2013.01)

(58) Field of Classification Search
CPC .... H04L 41/50; H04L 41/084; H04L 41/0813
See application file for complete search history.

(56) References Cited

U.S. PATENT DOCUMENTS 7,949,628 B1 * 5/2011 Blazek et al. ................ 707/600
2002/0069272 A1 6/2002 Kim et al.
(Continued)

FOREIGN PATENT DOCUMENTS

JP  7-231317  8/1995
JP  8-305650  11/1996
(Continued)

OTHER PUBLICATIONS

Extended European Search Report mailed Feb. 5, 2014 in corresponding European Application No. 13180055.9.
(Continued)

*Primary Examiner* — Blake Rubin
(74) *Attorney, Agent, or Firm* — Staas & Halsey LLP

(57) ABSTRACT

An information processing system includes an information processing device, a storage unit, a relay unit, and an update unit. The information processing device is an element of an information processing system. The storage unit stores integral information obtained by integrating information about the information processing device expressed as component information of the information processing system. The relay unit receives communication information including an update command for updating of the component information addressed to the information processing device, and transmits first communication information including the update command addressed to the information processing device and second communication information including the update command. The update unit receives the second communication information, and updates the integral information based on an update command included in the second communication information.

11 Claims, 24 Drawing Sheets

(56) References Cited

U.S. PATENT DOCUMENTS

| | | |
|---|---|---|
| 2003/0055529 A1 | 3/2003 | Aosawa |
| 2003/0228477 A1* | 12/2003 | DiMaio, Jr. .................. 428/480 |
| 2003/0229686 A1 | 12/2003 | Kortright |
| 2006/0136459 A1* | 6/2006 | Trinon .................... G06F 9/542 |
| 2006/0161879 A1* | 7/2006 | Lubrecht ............... G06Q 10/06 717/101 |
| 2007/0203952 A1* | 8/2007 | Baron .................... G06Q 10/06 |
| 2009/0083840 A1* | 3/2009 | Jensen .................... G06N 5/04 726/6 |
| 2009/0198801 A1* | 8/2009 | Waud ....................... G06F 8/67 709/221 |
| 2009/0228526 A1* | 9/2009 | Wada et al. .................. 707/201 |
| 2009/0228579 A1* | 9/2009 | Sanghvi ............. H04L 41/0843 709/224 |
| 2010/0070458 A1* | 3/2010 | Otsuka et al. ................. 706/59 |
| 2010/0161577 A1* | 6/2010 | Morozov ..................... 707/705 |
| 2010/0179939 A1* | 7/2010 | Rangarajan ....... G06F 17/30566 707/609 |
| 2010/0332544 A1* | 12/2010 | Collins et al. ................ 707/791 |
| 2011/0004675 A1* | 1/2011 | Wada ............... G06F 17/30997 709/220 |
| 2011/0016092 A1* | 1/2011 | Matsubara et al. ........... 707/654 |
| 2011/0029767 A1* | 2/2011 | Ayachitula ....... G06F 17/30303 713/100 |
| 2011/0035515 A1* | 2/2011 | Quach et al. .................. 710/38 |
| 2011/0087929 A1 | 4/2011 | Koshiyama |
| 2011/0125894 A1* | 5/2011 | Anderson et al. ............ 709/224 |
| 2011/0161288 A1* | 6/2011 | Morimoto et al. ........... 707/611 |
| 2011/0231429 A1* | 9/2011 | Wada ................ G06F 17/30566 707/769 |
| 2011/0292947 A1 | 12/2011 | Vobbilisetty et al. |
| 2012/0096163 A1* | 4/2012 | Tai ...................... H04L 41/0856 709/226 |
| 2012/0198282 A1* | 8/2012 | Carter ................ G06F 11/3006 714/39 |
| 2013/0010640 A1* | 1/2013 | Higuchi .............. H04L 12/4641 370/254 |

FOREIGN PATENT DOCUMENTS

| | | |
|---|---|---|
| JP | 2003-85005 | 3/2003 |
| JP | 2008-35266 | 2/2008 |
| JP | 2010-211271 | 9/2010 |
| WO | 2008/118761 A1 | 10/2008 |

OTHER PUBLICATIONS

Office Action mailed Feb. 9, 2016 in corresponding Japanese Patent Application No. 2012-183642.

* cited by examiner

FIG. 7A

BEFORE CONVERSION (COMMAND FORMAT)

```
update host-address -host-number 2 -address xxxx
```

FIG. 7B

TEMPLATE

```
<update>
  <item id="AAA" type="Server">
    <record type="observed">
      <host-address>
        <address id=BBB>CCC</address>
      </host-address>
    </record>
  </item>
</update>
```

FIG. 7C

AFTER CONVERSION (XML FORMAT)

```
<update>
  <item id="Server001" type="Server">
    <record type="observed">
      <host-address>
        <address id=2>xxxx</address>
      </host-address>
    </record>
  </item>
</update>
```

```
<item id="Server001" type="Server" >
  <record type="observed" >
    <name>svr1</name>
    <cpu>XXX</cpu>
    <memory>4GB</memory>
    <ipAddress>192.168.0.1</ipAddress>
    <status>error</status>
    ...
  </Server>
  </record>
</item>
```

FIG. 8A

```
<item id="user1" type="User" >
  <record type="observed" >
    <name>TARO</name>
    <organization>DEPARTMENT A</organization>
    <tel>012-345-XXXX</tel>
    <email>xxx@foo.bar.baz</email>
    ...
  </Server>
  </record>
</item>
```

FIG. 8B

```
<relationship id= "Rel1"  type= "ManagedBy" >
  <sourceItem>Server001</sourceItem>
  <targetItem>user1</targetItem>
  <record type= "observed" >
    <Status>normal</Status>
    ...
  </record>
</relationship>
```

FIG. 9

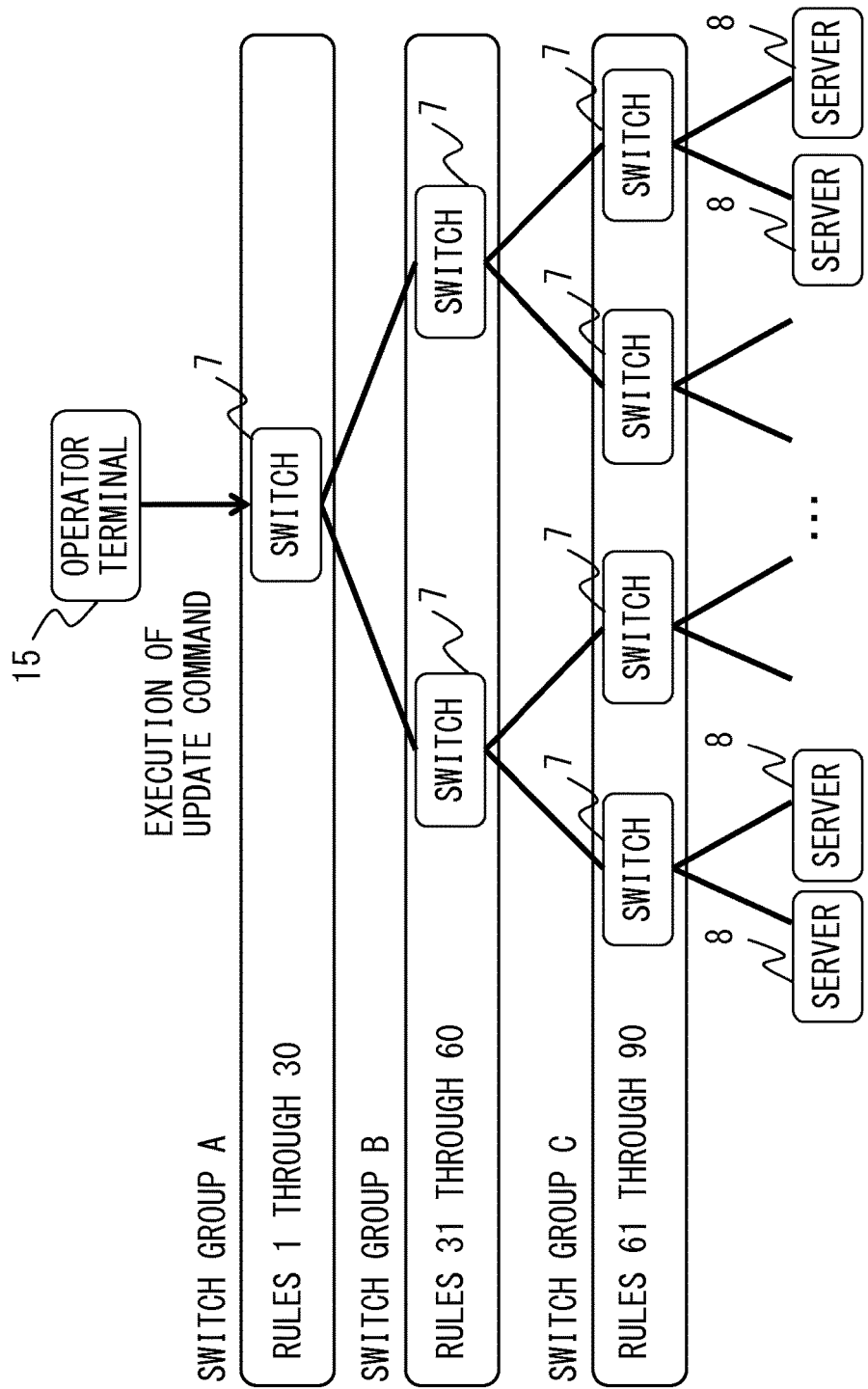
F I G. 11

| | |
|---|---|
| 1 | update host-address -host-number 2 -address 192.168.1.1 |
| 2 | ifconfig eth1 192.168.1.10 |
| 3 | xm mem-set vm01 1024 |
| 4 | delete user -name user1 |
| 5 | show status |
| ... | ... |

FIG. 13

| 1 | IF packet contains "update host-address", THEN forward to 192.168.0.1 |
| 2 | IF packet contains "ifconfig", THEN forward to 192.168.0.1 |
| 3 | IF packet contains "xm mem-set", THEN forward to 192.168.0.1 |
| 4 | IF packet contains "delete user", THEN forward to 192.168.0.1 |
| ⋮ | ⋮ |
| ⋮ | ⋮ |

COMMAND 1
```
<update>
  <item id="Server001" type="Server" >
    <record type="observed" >
      <host-address>
        <address id=2>192.168.1.1</address>
      </host-address>
    </record>
  </item>
</update>
```

COMMAND 2
```
<add>
  <item id="Server001" type="Server" >
    <record type="observed" >
      <ipAddress id=2>192.168.1.10</ipAddress>
      </host-address>
    </record>
  </item>
</add>
```

COMMAND 3
```
<update>
  <item id="vm01" type="VirtualMachine" >
    <record type="observed" >
      <memory>1024MB</memory>
    </record>
  </item>
</update>
```

COMMAND 4
```
<delete>
  <user name="user1" >
</delete>
```

COMMAND 1: BEFORE UPDATE

```
<item id="Server001" type="Server" >
 <record type="observed" >
  <name>svr01</name>
  <cpu>3.2GHz</cpu>
  ...
  <host-address>
   <address id=1>192.168.0.1</address>
   <address id=2>192.168.0.220</address>
  </host-address>
  ...
 </record>
</item>
```

FIG. 16A

COMMAND 1: AFTER UPDATE

```
<item id="Server001" type="Server" >
 <record type="observed" >
  <name>svr01</name>
  <cpu>3.2GHz</cpu>
  ...
  <host-address>
   <address id=1>192.168.0.1</address>
   <address id=2>192.168.1.1</address>
  </host-address>
  ...
 </record>
</item>
```

FIG. 16B

COMMAND 2: BEFORE UPDATE

```
<item id= "Server001" type= "Server" >
 <record type= "observed" >
  <name>svr01</name>
  <cpu>3.2GHz</cpu>
  ...
  <ipAddress id=1>192.168.0.32</ipAddress>
  ...
 </record>
</item>
```

FIG. 17A

COMMAND 2: AFTER UPDATE

```
<item id= "Server001" type= "Server" >
 <record type= "observed" >
  <name>svr01</name>
  <cpu>3.2GHz</cpu>
  ...
  <ipAddress id=1>192.168.0.32</ipAddress>
  <ipAddress id=2>192.168.1.10</ipAddress>
  ...
 </record>
</item>
```

FIG. 17B

COMMAND 3: BEFORE UPDATE

```
<item id="vm01" type="VirtualMachine" >
  <record type="observed" >
    <name>vm01</name>
    <cpu>2.0GHz</cpu>
    <memory>512MB</memory>
    ...
  </record>
</item>
```

FIG. 18A

COMMAND 3: AFTER UPDATE

```
<item id="vm01" type="VirtualMachine" >
  <record type="observed" >
    <name>vm01</name>
    <cpu>2.0GHz</cpu>
    <memory>1024MB</memory>
    ...
  </record>
</item>
```

FIG. 18B

INFORMATION PROCESSING SYSTEM, RELAY DEVICE, AND INFORMATION PROCESSING METHOD

CROSS-REFERENCE TO RELATED APPLICATIONS

This application is based upon and claims the benefit of priority of the prior Japanese Patent Application No. 2012-183642, filed on Aug. 22, 2012, the entire contents of which are incorporated herein by reference.

FIELD

The present invention is related to an information processing system.

BACKGROUND

A CMDB (configuration management database) is well known as a database which holds various types of information about the components of an ICT (information and communication technology) system for performing integral configuration management. The CMDB supports a user understanding the relationship between the components of an ICT system, and enables the user to manage an information system.

The CMDB includes component information configured by a CI (configuration item) which configures an ICT system and a relationship between two CIs. The CI refers to details of, for example, hardware such as a server, storage, etc. which configures an ICT system, software, etc. The relationship refers to the correlation between CIs about, for example, which piece of hardware the hardware configuring the ICT system is connected to, etc.

An MDR (management data repository) is used in collectively managing the information about the CIs. The MDR holds operation management data of an ICT system, and corresponds to the DB (database) of operation management middleware. There are a plurality of MDRs, and each MDR stores a different type and amount of data to be processed.

An FCMDB (federated configuration management database) virtually integrates a plurality of CMDBs or MDRs to enhance the efficiency of operation management. The FCMDB provides a user with a unified view of component information.

FIG. 1 is a configuration of an FCMDB obtained by virtually integrating a plurality of MDRs. As illustrated in FIG. 1, identical entities indicating the same items may be registered in a plurality of MDRs 2 (for example, A" of an MDR 12 (design information), A^ of an MDR 12 (performance information), A' of an MDR 12 (component information)). An FCMDB 11 merges and registers the identical entities stored in the above-mentioned plural MDRs 2 as one entry. The merging process is called a reconciliation. The FCMDB 11 reconciles and unifies data in CI units.

It is preferable that the information stored in the FCMDB 11 be updated in real time when, for example, the states of servers in an ICT system 14 are updated so that the acquired information does not deviate from the state of an actual server when a client 13 acquires information from the FCMDB 11.

A method of updating the FCMDB 11 when the component information is changed may be federation, to be performed to update the information stored in the FCMDB 11. Federation refers to a method of associating data through communication of data between a plurality of MDRs 2 and the FCMDB 11.

The technology described in the following document is known.

Document 1: Japanese Laid-open Patent Publication No. 07-231317

SUMMARY

According to an aspect of the embodiment, an information processing system includes an information processing system, a storage unit, a relay unit, and an update unit. The information processing device is an element of an information processing system. The storage unit stores integral information obtained by integrating information about the information processing device expressed as component information of the information processing system. The relay unit receives communication information including an update command for updating of the component information addressed to the information processing device, and transmits first communication information including the update command addressed to the information processing device and second communication information including the update command. The update unit receives the second communication information, and updates the integral information based on the update command included in the second communication information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A, 7B and 7C are explanatory views of an operation when the information about an update command is inserted into template data;

FIGS. 8A and 8B are examples of a data format of a CI stored in a configuration information database;

FIG. 9 is an example of a data format of the relationship stored in the configuration information database;

FIG. 11 is an explanatory view of distributing a load for each switch by assigning an update detection rule;

FIG. 13 is an example of an update command;

FIG. 14 is an example of an update detection rule;

FIG. 15 is an example of data after converting an update command;

FIGS. 16A and 16B illustrate data structures (1) of an FCMDB before and after the data of the FCMDB is updated;

FIGS. 17A and 17B illustrate data structures (2) of an FCMDB before and after the data of the FCMDB is updated;

FIGS. 18A and 18B illustrate data structures (3) of an FCMDB before and after the data of the FCMDB is updated;

DESCRIPTION OF EMBODIMENTS

There occurs a time lag when updating is performed if the information about an MDR is manually updated.

According to an information processing system according to the present embodiment, an update instruction to an information processing device is detected so as to update the information about an FCMDB.

Another method of updating the FCMDB 11 in real time is to configure the FCMDB 11 as a pull-type FCMDB. In this method, the FCMDB 11 does not store a reconciliation result, but acquires data from each MDR 12 for each retrieval request, and returns a reconciliation result to a retrieval requester. Although there is no time lag caused by reconciliation, the updating of the MDR 12 is insignificant unless it is performed in real time. Furthermore, since the time taken to perform the retrieval is longer than the time taken by the push-type FCMDB (simply referred to as an FCMDB in this specification), it is impractical.

Furthermore, a method for updating the FCMDB 11 in real time is to use the system of detecting updates in the middleware etc. on each server, and writing update information to the MDR 12 immediately after the update.

However, since adjusting of the middleware is requested in this method, there is a risk of causing a bug in the middleware, which may be a factor causing new problems. Therefore, it is a demerit that a large number of steps need to be taken for updating and maintenance of the middleware.

Therefore, the present embodiment provides the technology of detecting an update instruction to be issued to an information processing device, and updating the information about an FCMDB.

Figure 1:
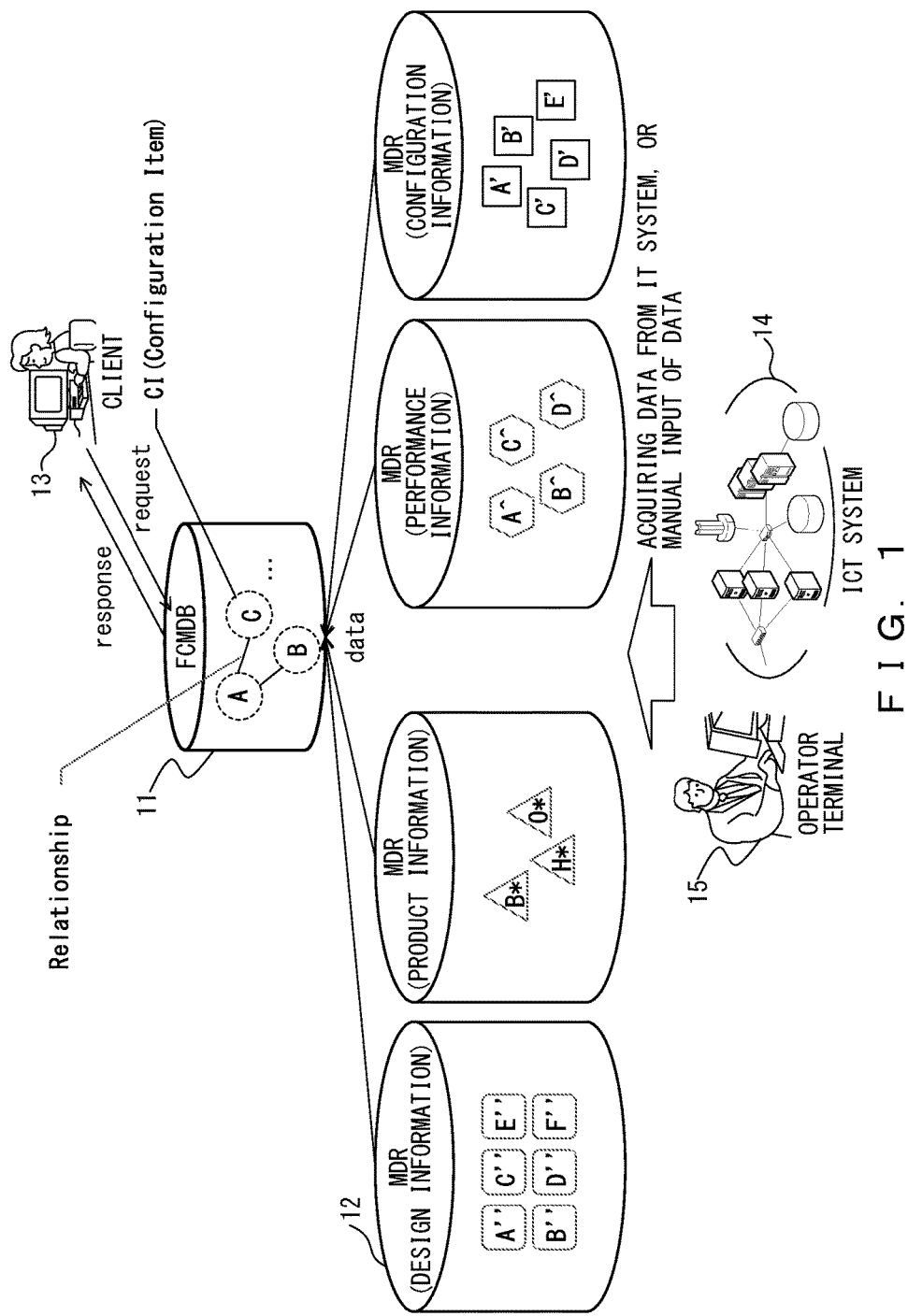
FIG. 1 is a configuration of an FCMDB obtained by virtually integrating a plurality of MDRs.
Figure 2:
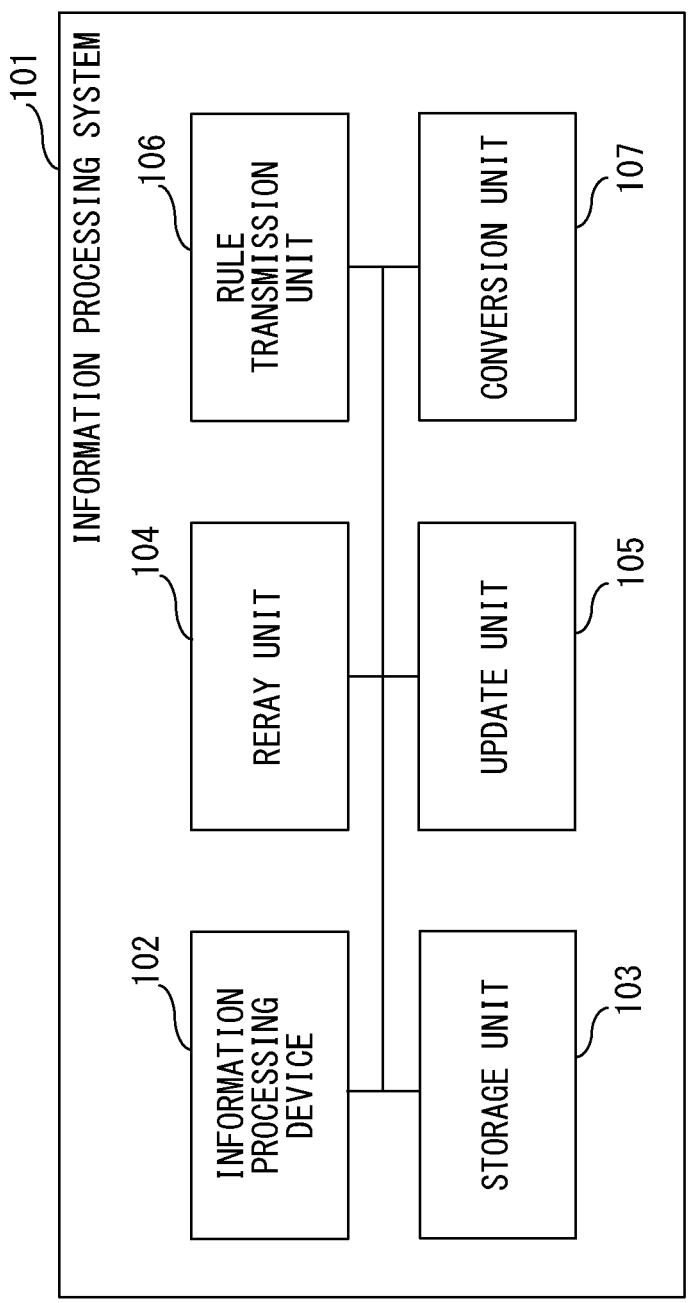
FIG. 2 is a block diagram of the function of the information processing system according to an embodiment of the present invention.

FIG. 2 is an example of a configuration of an information processing device according to the present embodiment.

An information processing system 101 includes an information processing device 102, a storage unit 103, a relay unit 104, an update unit 105, a rule transmission unit 106, and a conversion unit 107. The information processing device 102 is an element of the information processing system 101. The storage unit 103 stores integral information obtained by integrating the information about the information processing device 102 indicated as the component information of the information processing system 101.

The relay unit 104 receives communication information including an update command to update the component information addressed to the information processing device 102, and transmits first communication information including the update command addressed to the information processing device 102, and second communication information including an update command. When the relay unit 104 receives communication information, the relay unit 104 judges whether or not the source of the communication information is another relay unit 104 connected to the local relay unit 104. If the source of the communication information is not the other relay unit 104 connected to the local relay unit 104, the local relay unit 104 judges whether or not the received communication information includes an update command. If the received communication information includes an update command, the relay unit 104 transmits the first communication information including the update command and the second communication information including the update command. Furthermore, the relay unit 104 adds transfer completion information indicating that the first communication information has been transmitted to the update unit 105 to the first and second communication information. When the relay unit 104 receives the first or second communication information, the relay unit 104 judges whether or not the transfer completion information is included in the communication information, and judges whether or not the received communication information includes an update command based on the judgment result. Furthermore, when the relay unit 104 receives communication information, it judges whether or not the destination of the communication information is the conversion unit 107. If the destination of the communication information is not the conversion unit 107, it judges whether or not the received communication information includes an update command. If the received communication information includes an update command, the relay unit 104 transmits the first communication information including the update command, and the second communication information including the update command.

The update unit 105 receives the second communication information, and updates the integral information based on the update command included in the second communication information.

The rule transmission unit 106 transmits an update detection rule used by the relay unit 104 in judging whether or not the communication information includes an update command, and transmits an operation rule for regulating the operation of the relay unit 104 when it is judged that the communication information includes an update command. The relay unit 104 judges based on the update detection rule whether or not the communication information includes an update command, and operates according to the operation rule when it is judged that the communication information include an update command.

The conversion unit 107 receives the second communication information, and converts the update command included in the second communication information into a specified format. The update unit 105 updates the integral information using the converted update command.

With the configuration above, the update information of the information processing device 102 is acquired in real time without changing settings of existing middleware, and keeps the configuration information of the storage unit 103 up-to-date.

The configuration of the network which connects the FCMDB 11 to a server according to the present embodiment is described below. An example of a network configuration which connects the FCMDB 11 to a server may be network management technology called an SDN (software defined network). The SDN is a technique capable of programming the configuration and function of a network using software. In the SDN, a network administrator may freely describe the process to a frame which passes through a network. Thus, a communication path may be changed and controlled without changing the configuration of hardware. Furthermore, if the equipment of a network corresponds to an SDN, the equipment may be centrally managed in the SDN regardless of the type of equipment.

Figure 3:
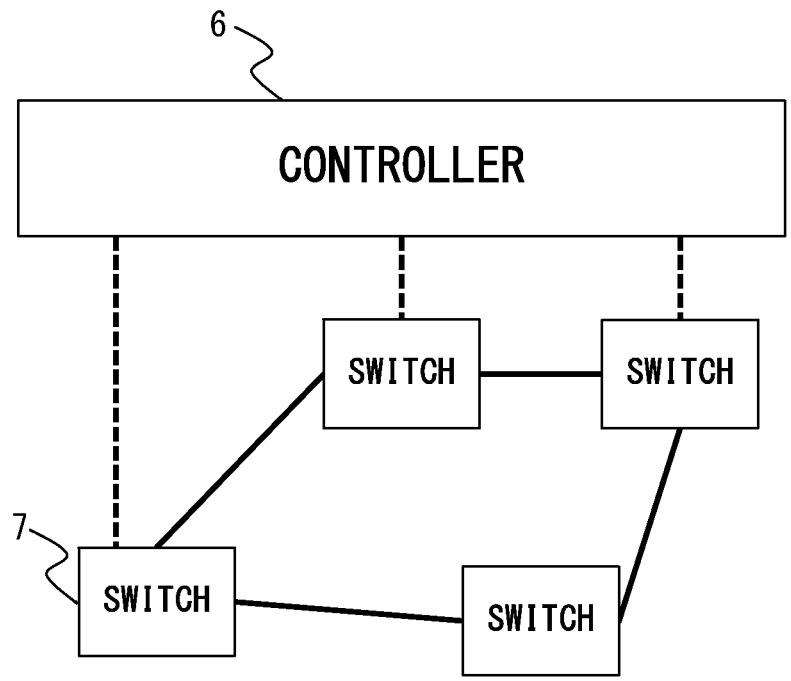
FIG. 3 is an explanatory view of the configuration of an SDN.

The SDN manages the path control function and the data transfer function separately in the network. FIG. 3 is an explanatory view of the configuration of an SDN.

The SDN is configured by two types of nodes, that is, a controller 6 and a switch 7. The controller 6 has a path control function of a network. Concretely, the controller 6 defines the operation rule of the switch 7, and distributes it to the switch 7, thereby performing the path control of the network. The operation rule defines, for example, how a frame of each type is processed in the frames received by the switch 7. The switch 7 has a data transfer function, and performs the process according to the operation rule distributed by the controller 6.

Concretely, the SDN may be realized using a communication protocol defined by the open network foundation (ONF) called OpenFlow.

Figure 4:
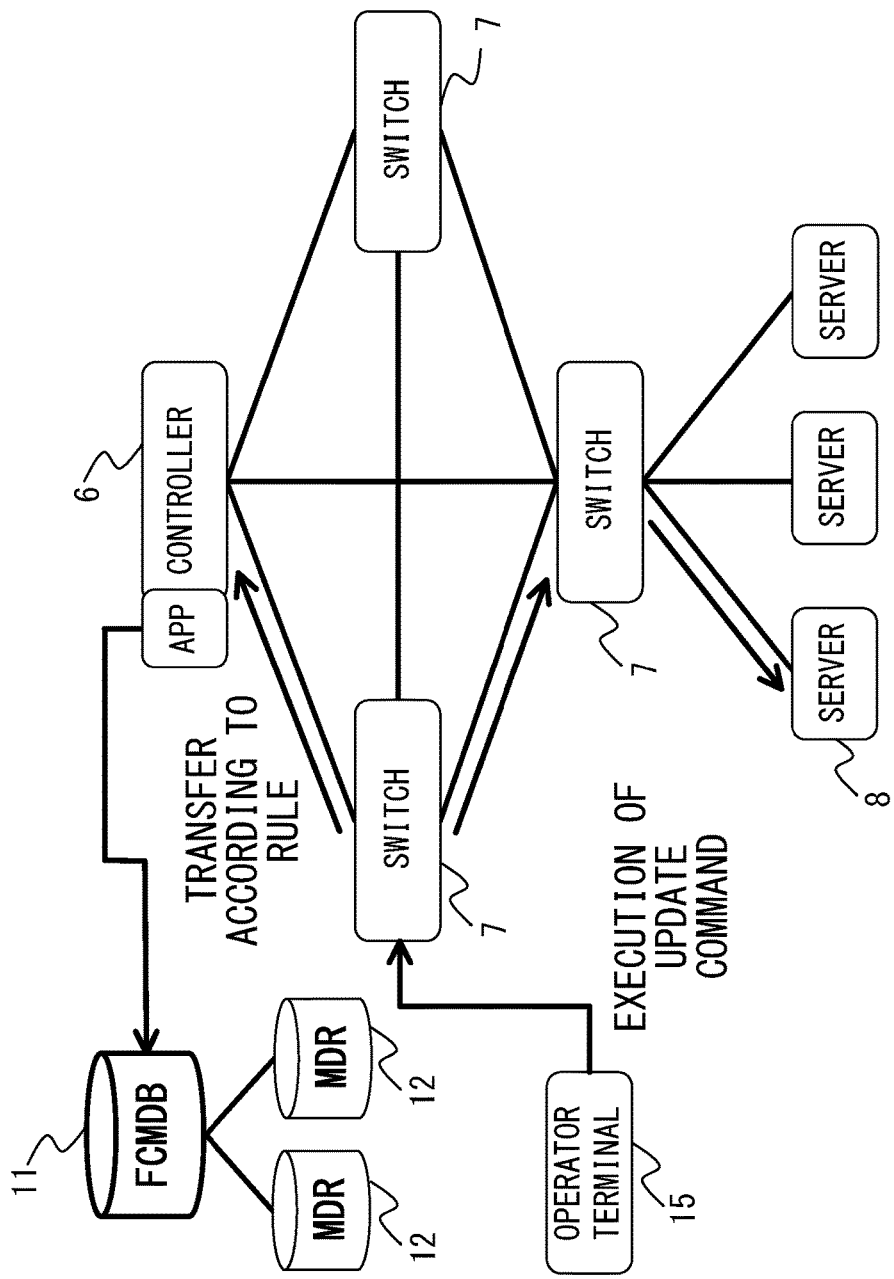
FIG. 4 is an example of a configuration of an information processing system according to an embodiment of the present invention.

FIG. 4 is an example of a configuration of an information processing system according to the present embodiment. The information processing system includes the FCMDB 11, the MDR 12, the controller 6, the switch 7, a server 8, and an operator terminal 15, and is connected through a network. The network in the information processing system is configured by the technology of an SDN. That is, the controller 6 has a path control function of a network, and defines the operation rule for regulation of the switch 7. The switch 7 performs the process according to the rule defined by the controller 6. A detailed explanation of each equipment unit is given later.

The process of updating the information of the server 8 when the update command is issued, and updating the information stored in the FCMDB 11 according to the present embodiment, is described below with reference to FIG. 4. In the description, it is assumed that the update command is input to the operator terminal 15 to update the information stored in the server 8.

When the operator terminal 15 acquires an update command for the server 8, the operator terminal 15 transfers the update command to the switch 7 for relay between the operator terminal 15 and the server 8 according to the predefined operation rule. Upon receipt of the update command, the switch 7 transfers the update command to the server 8 or the switch 7 for relay between the local switch 7 and the server 8. Simultaneously, the switch 7 replicates the received update command, and capsulates the replicated command for transfer, thereby transferring the command to the controller 6 or the switch 7 for relay between the local switch 7 and the controller 6. Upon receipt of the capsulated packet, the controller 6 converts the update command into data which is recognizable by the FCMDB 11, and transfers the converted data to the FCMDB 11. Upon receipt of the converted data, the FCMDB 11 reflects the contents of the update command from the database based on the received data.

Figure 5:
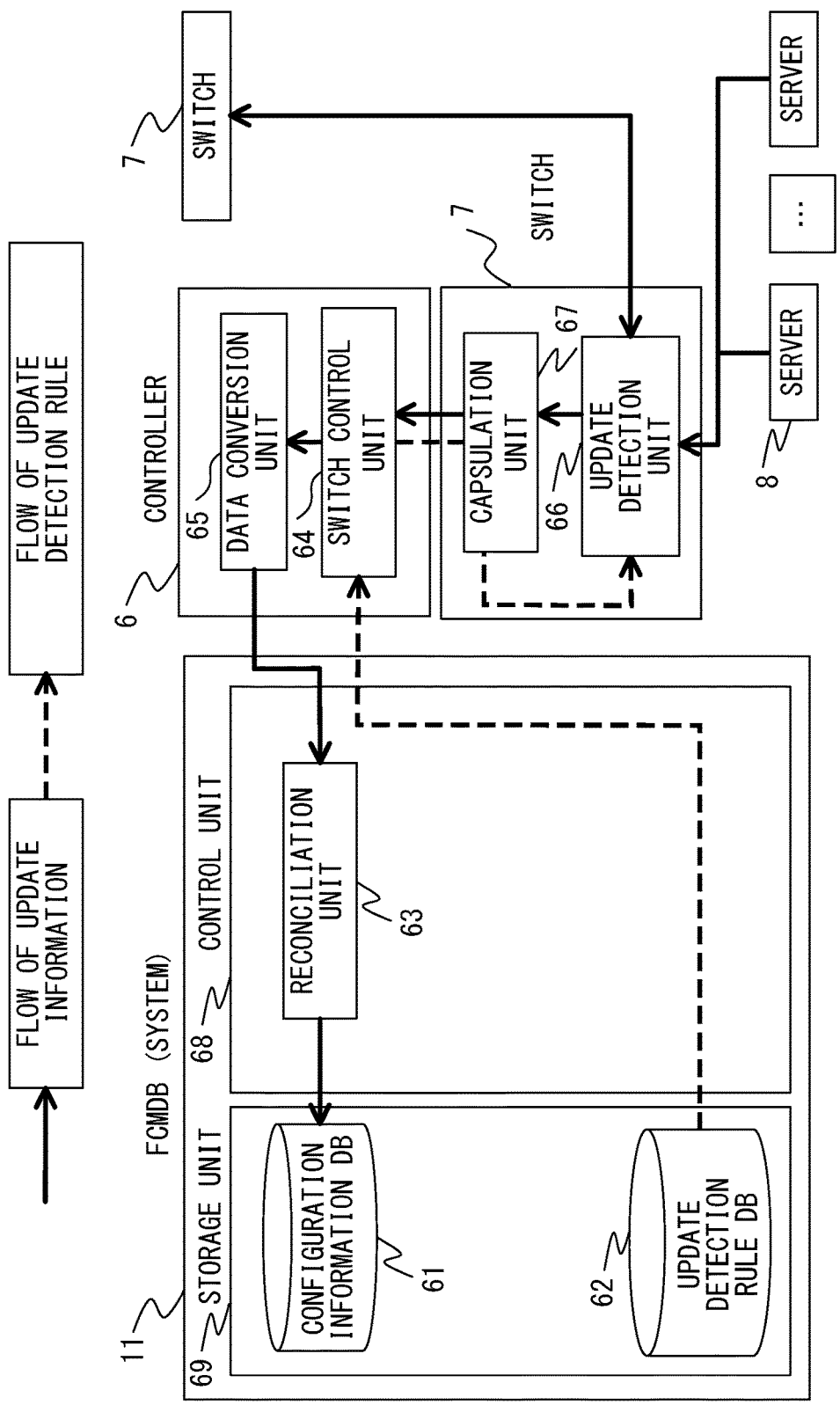
FIG. 5 is an example of a detailed configuration of an information processing system according to an embodiment of the present invention.

FIG. 5 is a detailed example of the configuration of an information processing system according to the present embodiment. The information processing system includes the FCMDB 11, the controller 6, the switch 7, and the server 8. The FCMDB 11 is an example of the storage unit 103 and the update unit 105. The controller 6 is an example of the rule transmission unit 106 and the conversion unit 107. The switch 7 is an example of the relay unit 104. The server 8 is an example of the information processing device 102.

The configuration of the switch 7 is described first.

The switch 7 includes an update detection unit 66 which detects an update command, and a capsulation unit 67 which capsulates the update command and transmits the command to the controller 6.

The update detection unit 66 detects an update command in the commands received by the switch 7. Concretely, when receiving a command, the update detection unit 66 judges according to the update detection rule whether or not the received command is an update command. The update detection rule and the judging process according to the update detection rule are described later in detail. When the update detection unit 66 judges that the received packet is an update command, the update detection unit 66 replicates the judged update command, and transfers the replicated update command to the capsulation unit 67. Simultaneously, the update detection unit 66 transfers all of the received commands to the destination of the commands regardless of whether or not each command is an update command. The update detection unit 66 may transfer the update command as it is replicated to the capsulation unit 67, and the replicated update command may be transmitted to the destination of the command.

The update detection rule is described next.

The update detection rule is used when the detecting process is performed in each switch 7. According to the update detection rule, which has, for example, a format such as an IF-THEN rule, a matching process may be performed on a packet which passes through the switch 7. The update detection rule may be generated by a system administrator, or by another method such as an automatic generating method, etc. The update detection rule is for detecting an update command from among the commands received by the switch 7, and is not limited to the IF-THEN format.

The update detection rule is stored in an update detection rule database (hereafter referred to as an update detection rule DB) 62 in a storage unit 69 of the FCMDB 11. The update detection rule stored in the update detection rule DB 62 is acquired by a switch control unit 64 of the controller 6, and is distributed to each switch 7.

Concretely, the update detection rule is provided in a format of, for example, "IF packet contains 'update host address', THEN forward to YYY", etc. This implies that if a received packet includes a particular character string (in this case, "update host-address"), then the packet is to be transferred to a particular destination ("YYY" in this example). For example, when the command received by the switch 7 is "update host-address-host-number 1-address xxxx", the command includes the character string "update host-address" in the command. Therefore, the switch 7 detects that the received command is an update command according to the update detection rule, and transfers it to the destination "YYY". In this case, the switch 7 transfers the update command after capsulating the update command in the process of transferring the command to the destination "YYY" because the transferred update command is executable, and may be executed at the destination if the update command is transferred as is.

The capsulation unit 67 capsulates an update command received from the update detection unit 66 to transfer the received update command to the controller 6. The capsulation refers to the technology of adding a new header to a packet, and transmits data according to the header.

Figure 6:
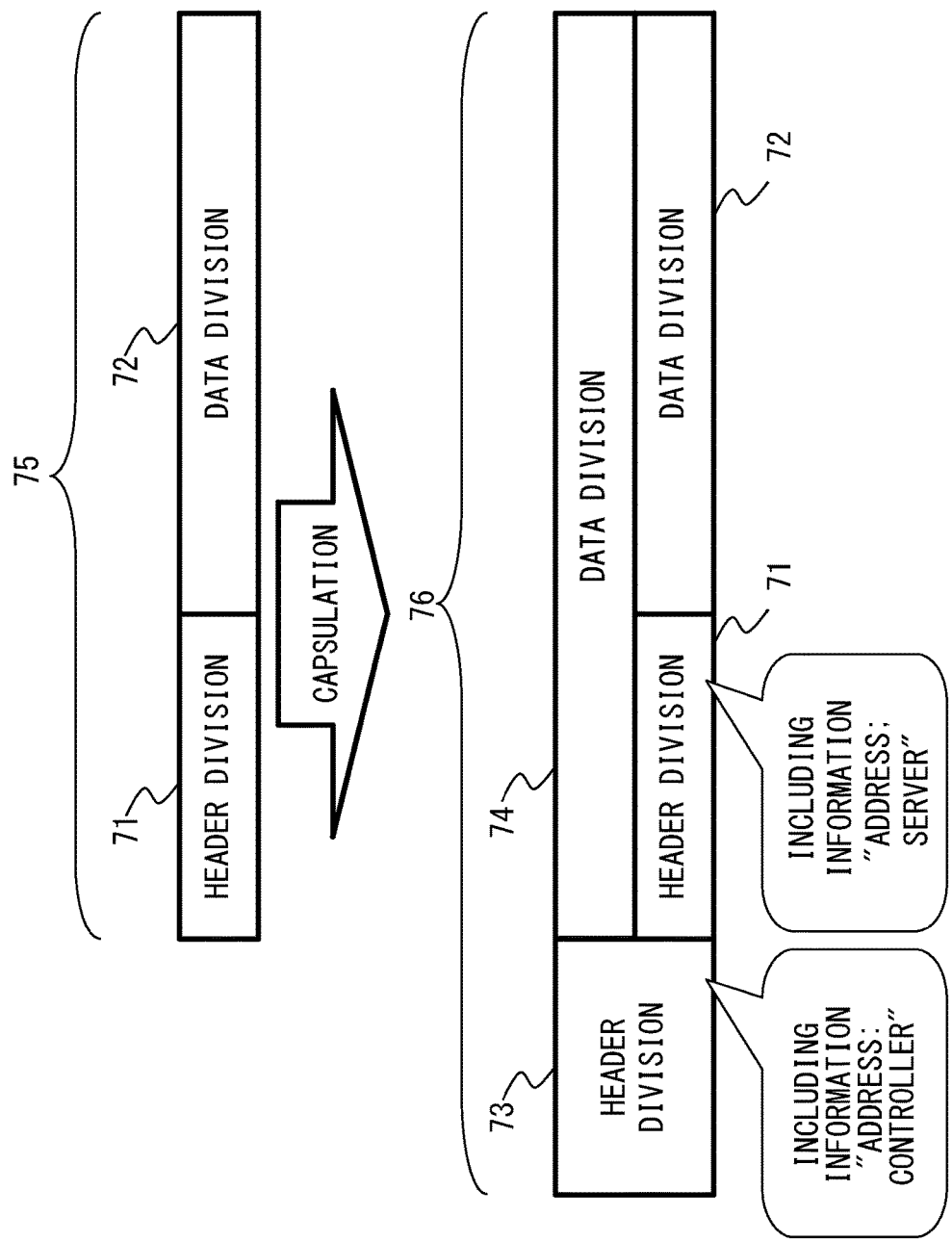
FIG. 6 is an explanatory view of a configuration before and after capsulating an update command according to an embodiment of the present invention.

A concrete operation of capsulating by the capsulation unit 67 according to the present embodiment is described below. FIG. 6 is an explanatory view of the configuration of the packet before and after the capsulation of an update command.

A packet 75 is an example of a packet of an update command before capsulating. The packet 75 is configured by a header division 71 and a data division 72. The header division 71 stores an address of a destination server, an address of the source, and necessary control information for communication of a packet. The data division 72 stores the contents of an update command.

A packet 76 is an example of a packet of a capsulated update command. Like the packet 75, the capsulated packet 76 is configured by a header division 73 and a data division 74. The header division 73 stores necessary information for communication of a packet, including destination information in which the controller 6 is specified as a destination. The data division 74 is configured by the entire packet 75 of the received command. As illustrated in FIG. 6, the data division 74 after the capsulation is a combination of the header division 71 and the data division 72 of the original packet 75.

In the data division 74 after the capsulation, the part corresponding to the header division 71 of the original packet 75 stores the destination information of the original packet 75. Thus, using the capsulated packet 76 including the destination information of the original packet 75, the controller 6 which has received the capsulated data may know the server 8 to which the update command is addressed. Described later, the information about which server 8 an update command is addressed to is used when the controller 6 converts the data format of an update command. The header division 71 and the data division 72 of the original packet 75 are not referred to until the capsulation is released.

The configuration of the controller 6 is described below. The controller 6 includes the switch control unit 64 which distributes a rule for regulation of the operation of the switch 7, and a data conversion unit 65 which converts the capsulated packet 76, which is received from the switch 7, into a data format recognizable by the FCMDB 11, and transmits the resultant packet to the FCMDB 11.

The switch control unit 64 distributes the operation rule for the operation of the switch 7 used in the SDN, and distributes the update detection rule according to which the switch 7 detects an update command and transfers it to the controller 6. When the update detection rule is changed, the switch control unit 64 reflects the contents of a change on the update detection rule DB 62 of the FCMDB 11.

The switch control unit 64 receives the capsulated packet 76 from the switch 7, and transfers the received packet 76 to the data conversion unit 65.

The data conversion unit 65 converts the capsulated packet 76 received from the switch control unit 64 into data in a format recognizable by the FCMDB 11. The data conversion unit 65 first converts the capsulated packet 76 into the format recognizable by the FCMDB 11, and then transfers the converted data to a reconciliation unit 63 of the FCMDB 11.

The data conversion by the data conversion unit 65 is described next in detail.

The data conversion unit 65 holds templates and conversion rules which correspond to each type of update command for conversion of received data into a format which may be registered in the FCMDB 11. The templates and conversion rules are stored in the storage area of the data conversion unit 65. The format which may be registered in the FCMDB 11 is, for example, an XML format, etc. In the present embodiment, the XML data format is described as a format which may be registered in the FCMDB 11, but the format which may be registered is not limited to the XML data format. Furthermore, the templates and the conversion rules may be stored in the storage unit 69 of the FCMDB 11, and the data conversion unit 65 may acquire the templates and the conversion rules from the storage unit 69 of the FCMDB 11 when using them.

Upon receipt of the capsulated packet 76, the data conversion unit 65 first decapsulates the received packet 76. That is, the data conversion unit 65 removes the header division 73 from the capsulated packet 76. The data from which the header division 73 has been removed is the update command before the capsulation. Next, the data conversion unit 65 acquires the templates and the conversion rules corresponding to the update command from the area of the storage unit. Then, the data conversion unit 65 extracts information from the update command according to the acquired conversion rules, and inserts the information into the templates.

The concrete operation performed when the information about an update command is inserted into the templates is described below with reference to the examples illustrated in FIGS. 7A, 7B and 7C. FIG. 7A is an example of an update command before conversion. FIG. 7B is an example of templates corresponding to an update command. FIG. 7C is an example of data after conversion.

First, the data conversion unit 65 determines an ID for uniquely identifying an update target of the update command on the basis of the destination address included in the header division 71 of the update command according to the conversion rule. An ID is determined by retrieving an ID of a target server from the FCMDB 11 on the basis of the destination address. Then, the data conversion unit 65 inserts the determined ID into the template. In the example in FIG. 7B, the ID of the determined target server is inserted into "AAA" in the template.

Next, the data conversion unit 65 inserts the value assigned by the parameter of the update command into an appropriate position of the template according to the conversion rule corresponding to the update command. In the examples of FIGS. 7A and 7B, the data conversion unit 65 inserts the value "2" of the parameter "-host-number" of the update command in FIG. 7A into "BBB" of the template of FIG. 7B, and inserts the value "xxxx" of the parameter "-address" into "CCC" of the template. The data after the insertion is illustrated in FIG. 7C.

In the present embodiment, the controller 6 receives the capsulated packet 76 and performs the update request transmission process to the FCMDB 11. The device which performs these processes may be different from the device which performs the process of the controller 6 in the SDN. In this case, the controller 6 performs only the process of the SDN, and another device receives the packet 76 and performs the update request transmission process. There may be a plurality of other devices to improve load dispersion and fault tolerance.

The configuration of the FCMDB 11 is described next. The FCMDB 11 includes a storage unit 69 which stores information, and a control unit 68 which controls a write and a read of the information to and from the storage unit 69.

The storage unit 69 includes a configuration information database (hereafter referred to as a configuration information DB) 61 and an update detection rule DB 62. The configuration information DB 61 stores a unified view of the CIs of the FCMDB 11. FIGS. 8A and 8B are examples of a data format of the CI stored in the configuration information DB 61. Furthermore, FIG. 9 is an example of the data format of the relationship stored in the configuration information DB 61. In the present embodiment, as illustrated in FIGS. 8A, 8B and 9, the configuration information DB 61 stores the data in the XML format.

The update detection rule DB 62 stores the update detection rule for regulation of the operation of the switch 7 for use in controlling the switch 7 by the controller 6. The update detection rule DB 62 is used by the switch control unit 64 of the switch 7.

The control unit 68 includes the reconciliation unit 63. The reconciliation unit 63 performs a reconciling process for merging identical entities stored in a plurality of MDRs 2 as one entity, and storing the entity in the configuration information DB 61. The reconciling process includes the process of reflecting the updated contents of a CI to the configuration information DB 61 when the CI is updated. In the present embodiment, as the reconciling process, the control unit 68 performs the process of reflecting or storing the contents of the update data received from the controller 6 to the configuration information DB 61.

Described next is the method of reducing the load of the switch 7 and the network which occurs by the switch 7 detecting the update command, capsulating the update command, and transferring the capsulated command to the controller 6.

As illustrated in FIG. 4, in the network, a plurality of switches 7 connect a plurality of servers, and the FCMDB 11 and each server are connected through the controller 6 and the switch 7. When an update command is issued from the operator terminal 15 to the server 8, the update command reaches the server 8 from the operator terminal 15 through one or more switches 7. This indicates that when an update command is issued, a plurality of switches 7 may receive the update command before the update command reaches the destination server 8. If all switches 7 which have received the update command transmit the capsulated update command to the controller 6, the traffic in the network increases.

The switch 7 has the double transfer protection function to prevent a capsulated command from being double issued from the switch 7 to the controller 6 for each update command.

Figure 10:
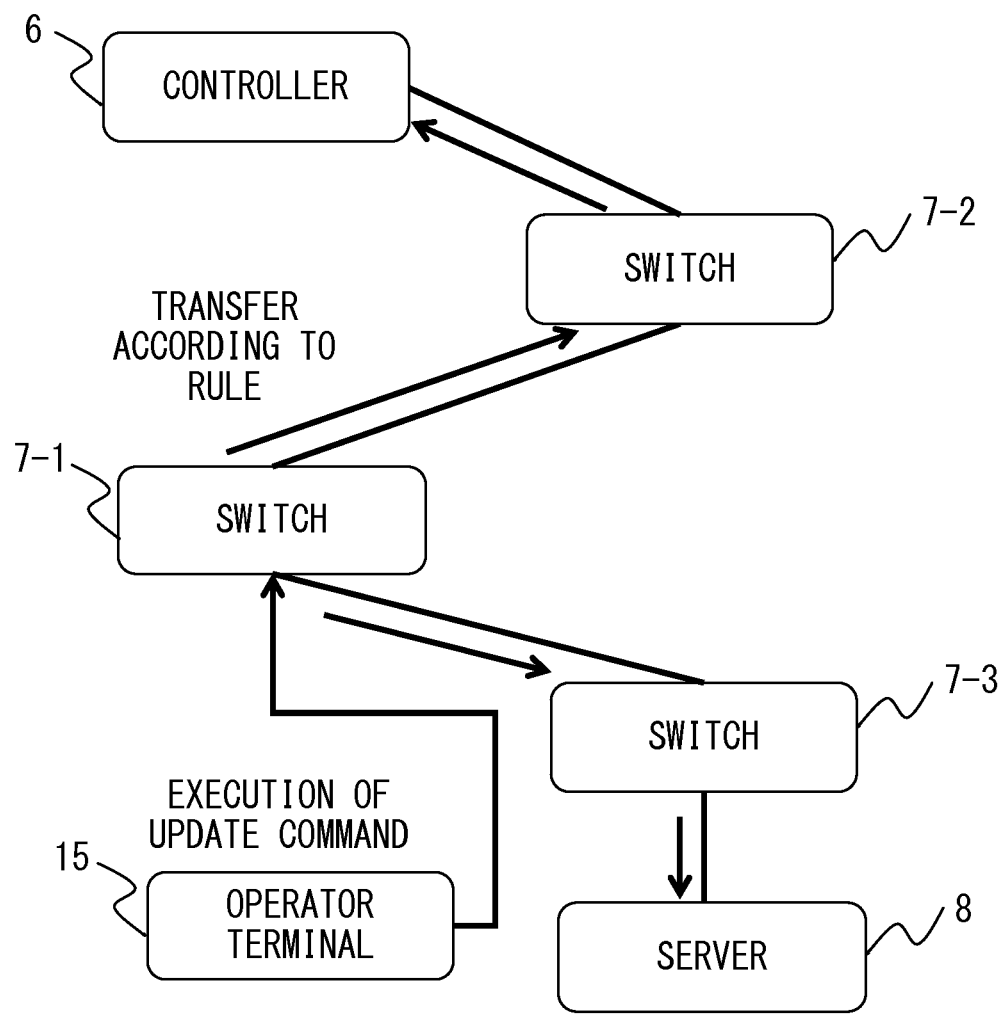
FIG. 10 is an explanatory view of a double transfer protection function.

FIG. 10 is an explanatory view of the double transfer protection function. To realize the double transfer protection function, the switch 7 which capsulates an update command and transfers the capsulated command to the controller 6 is defined as the switch 7 to first receive the update command issued from the operator terminal 15. In the example in FIG. 10, when the operator terminal 15 executes the update command, a switch 7-1 which first receives the update command in the network capsulates the update command and transfers the command to the controller 6. A switch 7-3 which receives the update command transferred from the switch 7-1 transfers the update command to the server 8, and does not capsulate the update command and transfer it to the controller 6. Furthermore, a switch 7-2 which has received the capsulated packet 76 transmitted from the switch 7-1 transfers the received packet 76 to the controller 6, and does not further capsulate the received packet 76 and transfer it to the controller 6.

Concretely, when the update detection unit 66 of each switch 7 receives a command, the update detection unit 66 first judges whether or not the received command is a first command in the network. Then, depending on the judgment result, the update detection unit 66 judges whether or not the received command is an update command, and whether or not the subsequent process is to be performed. The details of the operation flow of the switch 7 are described later.

The update detection unit 66 of the switch 7 confirms whether or not the update command has been transferred from the previous switch 7 to judge whether or not the received update command is first received in the network. If the update command is not transferred from the switch 7, the update detection unit 66 of the switch 7 judges that the received update command is first received in the network. If the update command is transferred from the switch 7, the update detection unit 66 of the switch 7 judges that the received update command is not first received in the network.

On the other hand, when a capsulated packet 76 is received, the switch 7 transfers the packet 76 according to the destination information stored in the header division 73 of the capsulated packet 76. In this case, the switch 7 does not judge whether or not the received packet is an update command, or does not perform the capsulating process.

A method for judging whether or not a received packet is a capsulated packet 76 may be a method using a destination address of the packet.

In the method of using the destination address of a packet, the update detection unit 66 of the switch 7 judges whether or not the destination address of a packet is the address of the controller 6, and judges that the packet has been capsulated if the destination address is the address of the controller 6. If the destination address is not the address of the controller 6, the switch 7 judges that the packet is not capsulated.

As another method of the switch 7, judging whether or not the received update command is first received in the network, and judging whether or not the received packet is a capsulated packet 76, there is a method of providing a detection completion flag (transfer completion flag).

The method of providing a detection completion flag is to add to a received packet a detection completion flag indicating that the update command corresponding to the received packet has been transferred to the controller 6. When the update detection unit 66 of the switch 7 judges that the received command is an update command, it adds a detection completion flag to the received command. Then, the update detection unit 66 replicates the update command to which the detection completion flag has been added, transfers the replicated update command to the capsulation unit 67, and transfers the update command to which the detection completion flag has been added to the server at the destination. On the other hand, when a packet to which the detection completion flag has been added is received, the switch 7 transfers the received packet to the address at the destination, and does not judge whether or not the received packet is an update command. The detection completion flag may be provided at the header division 71 of the original packet 75 received by the switch 7.

A method of distributing the load of the switch 7 in the present embodiment is described next. As a method for distributing the load of the switch 7, there is a method of assigning a different update detection rule to each switch 7 in the network, and a method of passing a certain number of update commands without detection and getting another switch 7 to detect an update command.

First, the method of assigning a different update detection rule to each switch 7 is described. The process load per packet of the switch 7 increases with a larger number of rules which the switch 7 follows. When all update detection rules to all switches are uniformly set, the process load of each switch 7 increases. Then, by assigning a different update detection rule for each switch 7, the load is distributed.

FIG. 11 is an explanatory view of distributing a load for each switch 7 by assigning an update detection rule to each switch 7. In the example in FIG. 11, ⅓ of the update detection rule is assigned to each switch 7, and the load for each switch 7 is distributed. That is, assume that there are 90 update detection rules, the rules 1 through 30 are set to the switch 7 included in the switch group A, the rules 31 through 60 are set to the switch 7 included in the switch group B, and the rules 61 through 90 are set to the switch 7 included in the switch group C. In this case, the update detection rule is distributed so that it may be judged whether or not a command is an update command for all update detection rules through any path from an operator for issuing an update command to any server.

A method of passing a certain number of update commands without detection when update commands are continuously received, and getting another switch 7 to detect an update command is described next.

If update commands are continuously received, and the next switch 7 may detect an update command, then a certain number of commands may be passed without detection, and the next switch 7 may detect them. Thus, the concentration of the load on only the particular switch 7 may be prevented. Thus, "next" in the next switch 7 refers to "next" in the order of the switch 7 for which an update command is relayed from among a plurality of switches 7 on the path from the terminal which has issued the update command to the server at the destination of the update command.

Figure 12:
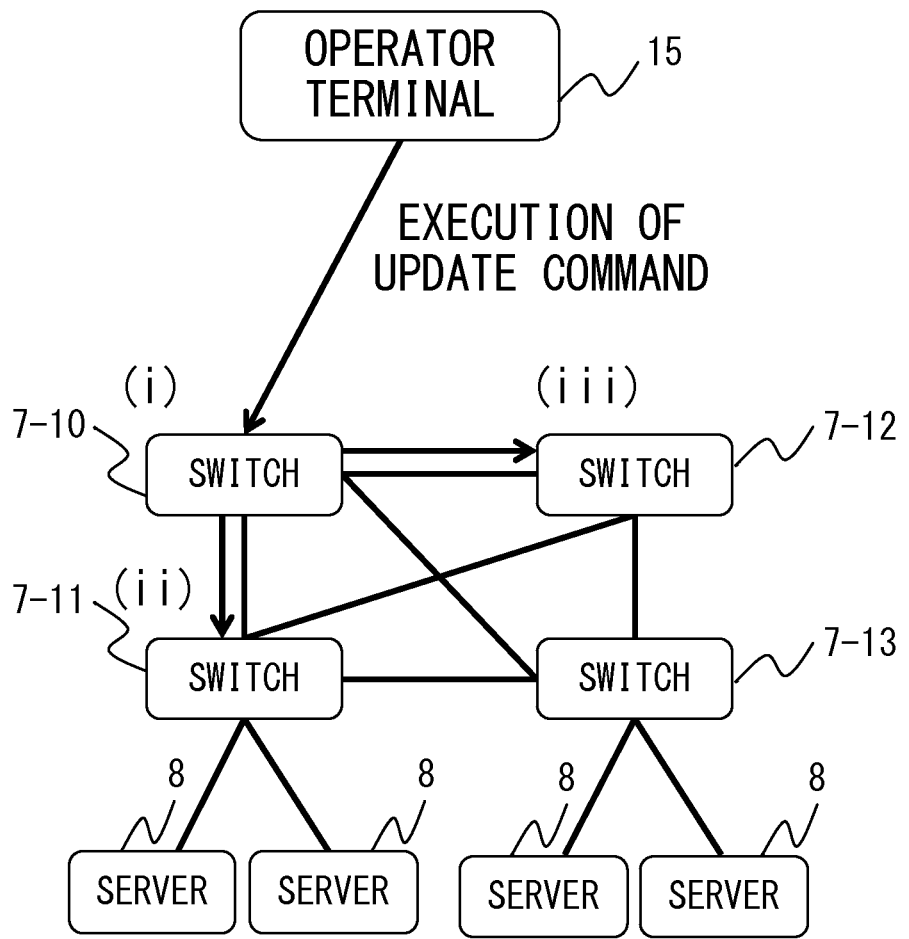
FIG. 12 is an explanatory view of a method for passing along a certain number of update commands without detection when update commands are continuously received and for getting another switch to detect the update commands.

FIG. 12 is an explanatory view of the method of passing along a certain number of update commands without detection when update commands are continuously received, and getting another switch 7 to detect them.

When there are a plurality of switches on the path from the terminal which has issued an update command to the destination server of a command, the switch 7 which first receives the update command assigns a packet to another switch 7. Concretely, a switch 7-10 which has first received a command performs the update command detecting process. Then, the switch 7-10 does not perform the update command detecting process on the next continuously received command, and transfers it to a switch 7-11 connected to the switch 7-10. Then, the switch 7-11 which has received the transferred update command performs the update command detecting process. Furthermore, the switch 7-10 transfers the next continuously received command to another switch 7-12 connected to the switch 7-10, and the switch 7-12 performs the update command detecting process.

The operation rule of the switch 7 controls which command is to be transferred to which switch 7 by the switch which has continuously received commands. The switch 7 which performs the process of detecting an update command may be changed depending on the reception frequency of executable commands or the state of the load of each switch 7. In this method, all switches 7 in the network hold the detection rule corresponding to all update commands.

Next, the process flow from the issue of an update command by the operator terminal 15 to the reflection by the FCMDB 11 is explained with reference to the change in data structure of the update command. Concretely, the command detection rule, the change of a command, and the update of the FCMDB 11 are explained with reference to FIGS. 13 through 19.

FIG. 13 is an example of an update command. FIG. 14 is an example of an update detection rule. FIG. 15 is an example of a converted update command after conversion of the update command. FIGS. 16 through 19 illustrate the data structure of the FCMDB 11 before and after the data of the FCMDB 11 is updated. The command numbers in FIG. 13 correspond to those in FIGS. 13 through 19. In this example, assuming that five commands are issued as illustrated in FIG. 13, the change of data is explained below when the switch 7 detects a command, the detected update command is converted into a format which may be registered in the FCMDB 11, and the converted data is registered in the FCMDB 11.

In FIG. 13, a command 1 has the command name of "update host-address", the name of a first parameter is "-host-number" and its value is "2", the name of a second parameter is "-address" and its value is "192.168.1.1". The command is to set the address of the host having the host number of "2" as "192.168.1.1".

A command 2 has a command name of "ifconfig", the value of the first parameter is "eth1", and the value of the second parameter is "192.168.1.10". The command is to set the IP address of the interface having the interface name of "eth1" as "192.168.1.10".

A command 3 has a command name of "xm mem_set", the value of the first parameter is "vm01", and the value of the second parameter is "1024". The command is to set the assignment of the memory as "1024" for the virtual host having the server name of "vm01".

A command 4 has a command name of "delete user", the name of the first parameter is "-name" and its value is "user1". The command is to delete a user having the user name of "user1".

A command 5 has a command name of "show status" and confirms the status of the server.

FIG. 14 illustrates the update detection rule corresponding to the commands 1 through 4 in FIG. 13. The update detection rule describes a command name to be detected, and a destination address when the command is detected. In this example, "IF packet contains 'command name', THEN forward to destination address". The name of the update command is set as a command name. In this example, the names corresponding to the commands 1 through 4 in FIG. 13 are set as the command names of the update detection rules 1 through 4. The address of the controller 6 is set as a destination address. In this example, the address of the controller 6 is "192.168.0.1". Since the command 5 in FIG. 13 is not an update command, there is no corresponding update detection rule.

FIG. 15 is an example of converting the data formats corresponding to the commands 1 through 4 in FIG. 13. The data format is converted by the data conversion unit 65 of the controller 6. The data conversion unit 65 acquires a template corresponding to each command. Then, the data conversion unit 65 inserts the contents of the parameter of the update command into a particular position of the acquired template. The conversion rule defines the position in the template into which the contents of the parameter of the update command are to be inserted.

For example, in the case of the command 1, it is defined as a rule that the value "2" of the parameter "-host-number" of the command 1 is assigned to the attribute value of the attribute "id" of the element name "address" of the XML template. In addition, it is defined as a rule that the value "192.168.1.1" of the parameter "-address" is assigned to the content of the element name "address" of the XML template.

In the case of the command 2, it is defined as a rule that the first argument value "eth1" of the command 2 is assigned to the attribute value of the attribute "id" of the element name "ipAddress" of the XML template. Furthermore, it is defined as a rule that the first argument value "192.168.1.10" is assigned to the content of the element name "ipAddress" of the XML template.

In the case of the command 3, it is defined as a rule that the first argument value "vm01" of the command 3 is assigned to the attribute value of the attribute "id" of the element name "item" of the XML template. In addition, it is defined as a rule that the value "1024" of the second argument is assigned to the content of the element name "memory" of the XML template.

In the case of the command 4, it is defined as a rule that the value "user1" of the packet "-name" of the command 4 is assigned to the attribute value of the attribute "name" of the element name "user" of the XML template.

FIGS. 16 through 19 illustrate the data structure before and after reflection of the contents of the commands 1 through 4 in the data of the FCMDB 11. That is, FIGS. 16 through 19 illustrate the data of the FCMDB 11 before and after the updating process performed when the control unit 68 of the FCMDB 11 which has received the XML data 1 through 4 in FIG. 15, which corresponds to the commands 1 through 4 in FIG. 13, performs the process of updating the received contents on the FCMDB 11.

FIG. 16A is an example of the data of the FCMDB 11 before reflection of the update contents of the command 1. The part FIG. 16B is an example of the data of the FCMDB 11 after reflection of the update contents of the command 1. In FIG. 16A before reflection of the update contents, the contents of the element having the attribute value "2" of the attribute "id" of the element name "address" is "192.168.0.220". In FIG. 16B after reflection of the update contents, the contents of the element having the attribute value "2" of the attribute "id" of the element name "address" are updated to "192.168.1.1". The update is a result of the reflection of the contents of the XML data 1 in FIG. 15 to the data of the FCMDB 11.

FIG. 17A is an example of the data of the FCMDB 11 before reflection of the update contents of the command 2, and the FIG. 17B is an example of the data of the FCMDB 11 after reflection of the update contents of the command 2. In FIG. 17A before reflection of the update contents, there is no element having the attribute value "2" of the attribute "id" of the element name "ipAddress". On the other hand, in FIG. 17B, after reflection of the update contents, an element having the attribute value "2" of the attribute "id" of the element name "ipAddress" is added, and the contents of the element are "192.168.1.10". The update is a result of reflection of the contents of the XML data 2 to the data of the FCMDB 11.

FIG. 18A is an example of the data of the FCMDB 11 before reflection of the update contents of the command 3, and FIG. 18B is an example of the data of the FCMDB 11 after reflection of the update contents of the command 3. In FIG. 18A, the contents of the element name "memory" is "512 MB". On the other hand, in FIG. 18B after reflection of the update contents, the contents of the element name "memory" are updated to "1024 MB". The update is a result of the reflection of the contents of the XML data 3 in FIG. 15 to the data of the FCMDB 11.

Figures 19A, 19B:
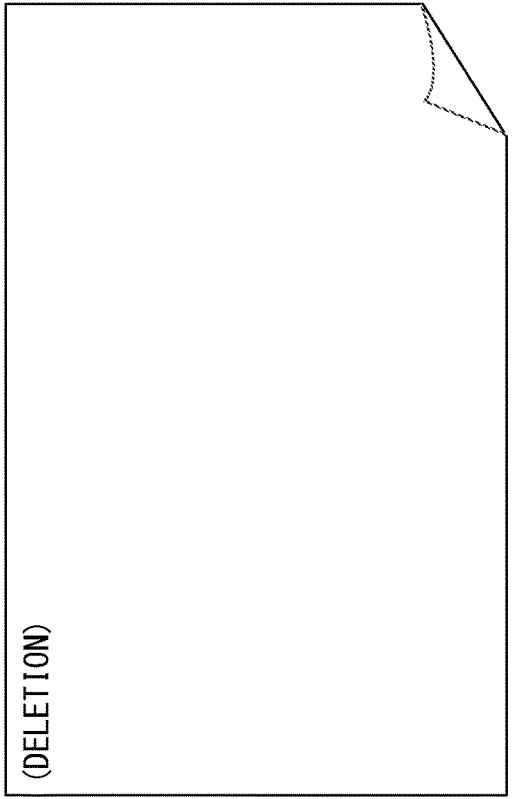
FIGS. 19A and 19B illustrate data structures (4) of an FCMDB before and after the data of the FCMDB is updated.

FIG. 19A is an example of the data of the FCMDB 11 before reflection of the update contents of the command 4, and FIG. 19B is an example of the data of the FCMDB 11 after reflection of the update contents of the command 4. In FIG. 19A before reflection of the update contents, there is an element having the attribute value "user1" of the attribute "id" of the element name "item". On the other hand, in FIG. 19B after reflection of the update contents, the contents of the element having the attribute value "user1" of the attribute "id" of the element name "item" are deleted, and do not exist. The update is a result of the reflection of the contents of the XML data 4 in FIG. 15 to the data of the FCMDB 11.

Figure 20:
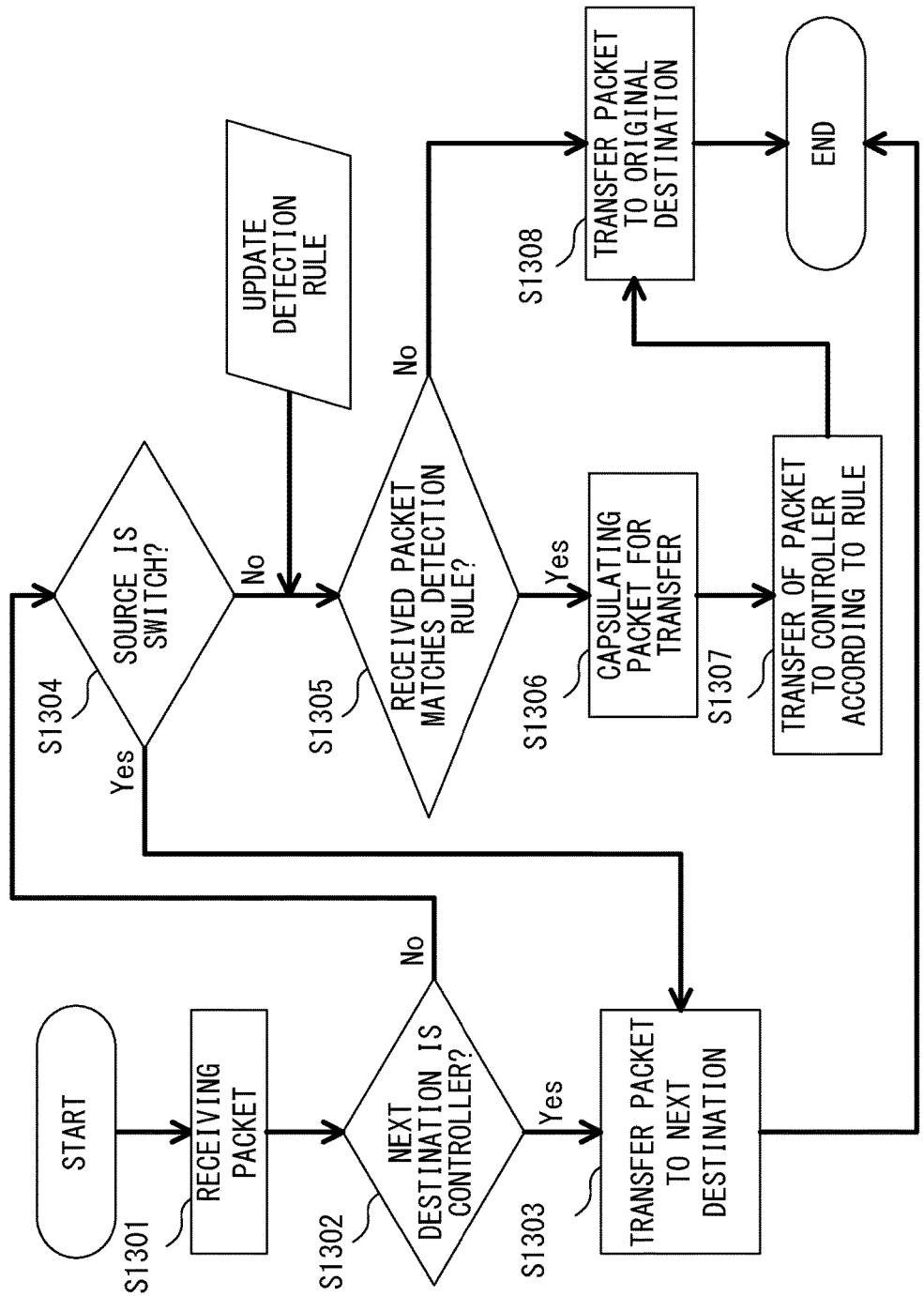
FIG. 20 is a flowchart of an operation of a switch according to an embodiment of the present invention.

Next, the flow of the process of the switch 7 is described below. FIG. 20 is a flowchart of the operation of the switch 7 according to the present embodiment.

First, upon receipt of a packet (S1301), the switch 7 judges whether or not the next destination is the controller 6 (S1302). Concretely, the switch 7 refers to the header division of the received packet, and judges whether or not the destination address is the address of the controller 6.

When the next destination is the controller 6 (YES in S1302), the switch 7 transfers the received packet to the controller 6 (S1303), thereby terminating the process.

If it is judged in S1302 that the next destination is not the controller 6 (NO in S1302), the switch 7 judges whether or not the received packet has been transferred from the switch 7 (S1304). Concretely, the switch 7 refers to the header division of the received packet and judges whether or not the address of the source is the switch 7.

If it is judged that the source is the switch 7 (YES in S1304), the received packet is transferred to the switch 7, the controller 6, or the server 8 as the destinations of the received packet (S1303), thereby terminating the process. If it is judged that the source is not the switch 7 (NO in S1304), then the switch 7 judges whether or not the received packet matches the update detection rule (S1305).

When the received packet matches the update detection rule (YES in S1305), the switch 7 replicates the packet, and the replicated packet is capsulated for transfer (S1306).

Next, the switch 7 transfers the capsulated packet to the controller 6 according to the destination address of the update detection rule (S1307).

Next, the switch 7 transfers the received packet to the destination (S1308), thereby terminating the process.

If the received packet does not match the update detection rule in S1305, the switch 7 transfers the received packet to the destination (S1308), thereby terminating the process.

Figure 21:
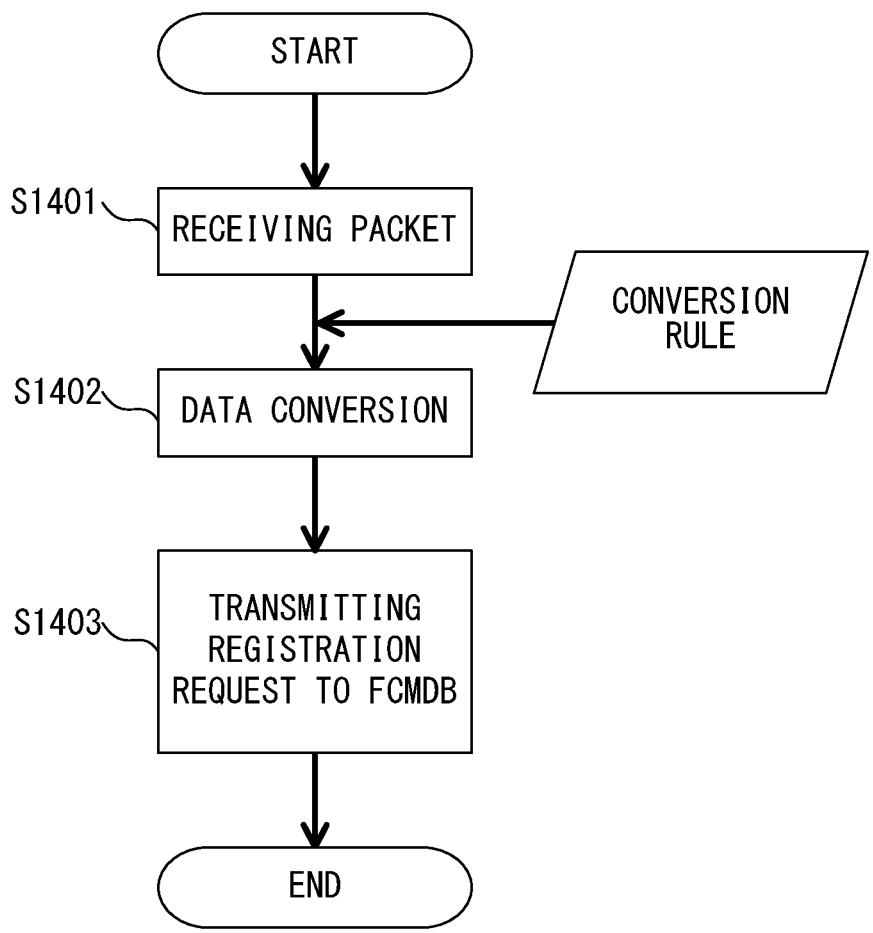
FIG. 21 is a flowchart of an operation of a controller according to an embodiment of the present invention.

The flow of the process in the update detection unit 66 is described next. FIG. 21 is a flowchart of the operation of the controller 6 according to the present embodiment.

Upon receipt of a packet (S1401), the controller 6 converts the data into a format which may be registered in the FCMDB 11 using a conversion rule (S1402). Next, the controller 6 transmits a registration request including the data converted in S1402 to the FCMDB 11 (S1403), thereby terminating the process.

Figure 22:
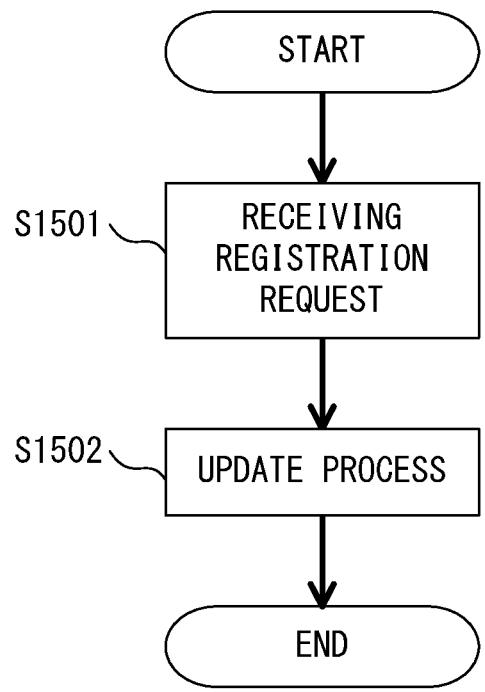
FIG. 22 is a flowchart of an operation of an FCMDB according to an embodiment of the present invention.

Next, the flow of the process in the FCMDB 11 is described. FIG. 22 is a flowchart of the operation in the FCMDB 11 according to the present embodiment.

Upon receipt of a registration request (S1501), the FCMDB 11 performs the updating process of reflecting the contents of the registration request to the configuration information DB 61 (S1502), thereby terminating the process.

Variation Example 1

To prevent an update command from being double transferred from the switches 7 to the controller 6, there is a method of the switch 7 adding a detection completion flag to a packet, and when a packet with a detection completion flag is received, the switch 7 does not perform the detecting process.

Figure 23:
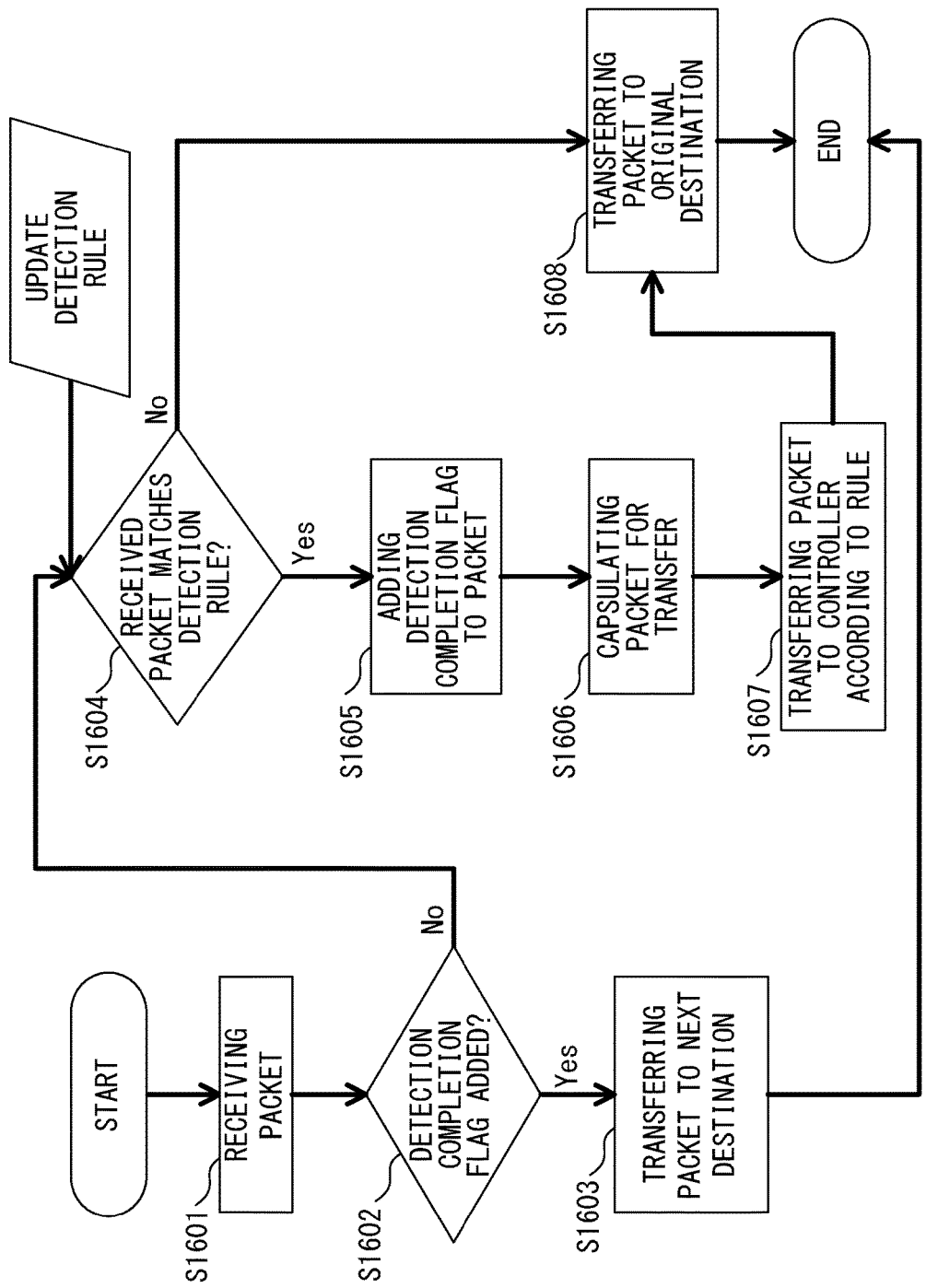
FIG. 23 is a flowchart of an operation of a switch when a method for adding a detection flag to a packet is adopted to prevent a double transfer of a packet.

FIG. 23 is a flowchart of the operation of the switch 7 when the method of adding a detection completion flag to a packet is adopted to prevent a double transfer of a packet.

First, upon receipt of a packet (S1601), the switch 7 judges whether or not a detection completion flag is being added to the received packet (YES in S1602). When the detection completion flag is being added to the received packet (YES in S1602), the switch 7 transfers the received packet to the switch 7, the controller 6, or the server 8 as a destination of the received packet (S1603), thereby terminating the process.

In S1602, if the detection completion flag is not being added to the received packet (NO in S1602), the switch 7 judges whether or not the received packet matches the update detection rule (S1604). If the received packet matches the update detection rule (YES in S1604), the switch 7 adds the detection completion flag to the received packet (S1605).

Next, the switch 7 replicates the packet to which the detection completion flag is added, and capsulates the replicated packet for transfer (S1606). Next, the switch 7 transfers the capsulated packet to the controller 6 according to the destination address of the update detection rule (S1607).

Next, the switch 7 transfers the received packet to the original destination of the received packet (S1608), thereby terminating the process. If the received packet does not match the update detection rule in S1604 (No in S1604), the switch 7 transfers the received packet to the original destination of the received packet (S1608), thereby terminating the process.

Figure 24:
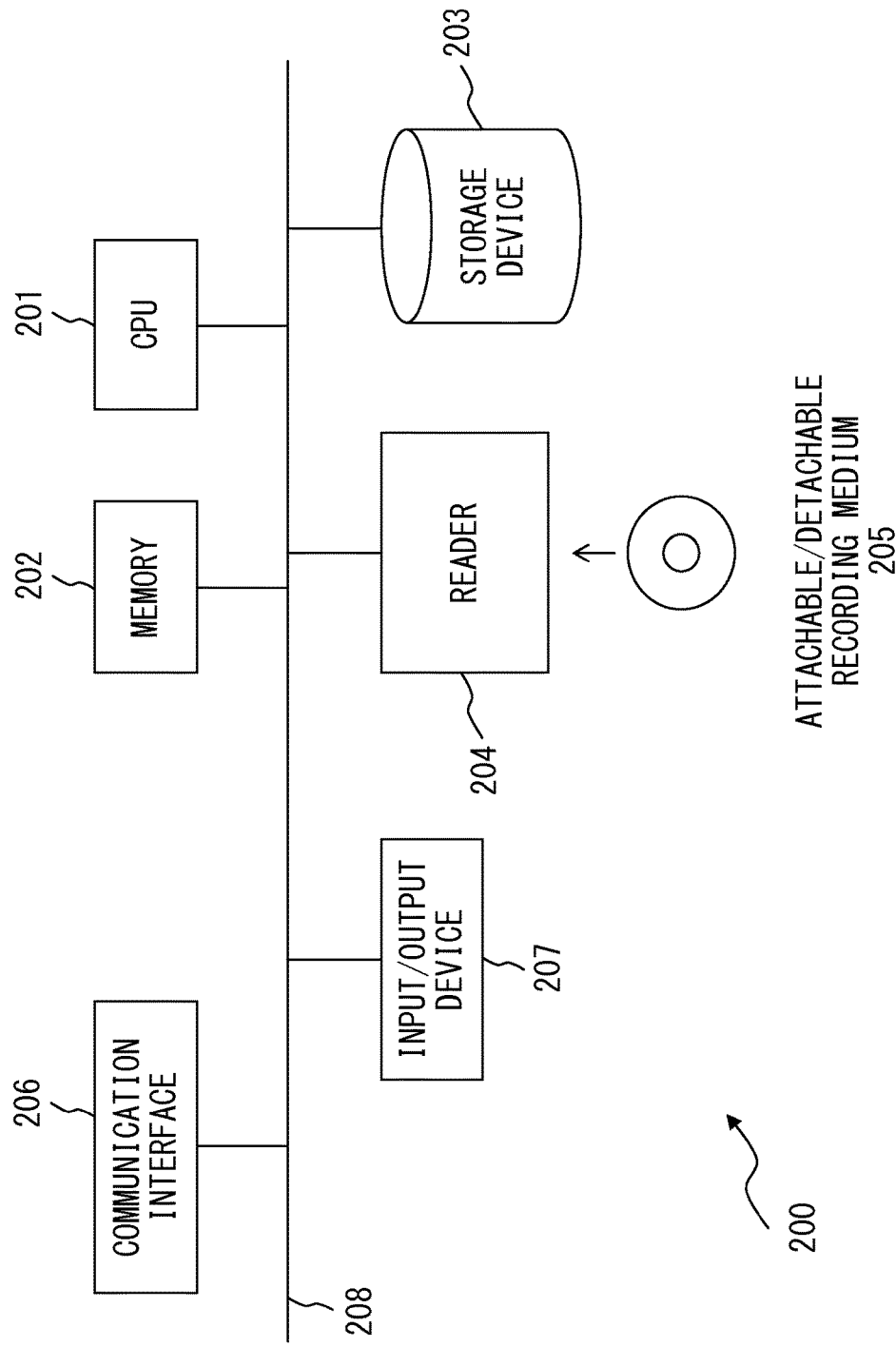
FIG. 24 is a configuration of hardware of equipment according to an embodiment of the present invention.

The configuration of the hardware of the FCMDB 11, the controller 6, and the server 8 is described next. FIG. 24 is an example of the hardware configuration of the FCMDB 11, the controller 6, the switch 7, and the server 8. As illustrated in FIG. 24, a computer 200 includes a CPU 201, memory 202, a storage device 203, a reader 204, a communication interface 206, and an input/output device 207. The CPU 201, the memory 202, the storage device 203, the reader 204, the communication interface 206, and the input/output device 207 are interconnected via a bus 208. The computer 200 is described as an example of the hardware configuration of the FCMDB 11, the controller 6, the switch 7, and the server 8.

The CPU 201 provides all or a part of the functions of the control unit 68, the switch control unit 64, the data conversion unit 65, the update detection unit 66, and the capsulation unit 67 by executing a program which describes the procedure of the flowchart above using the memory 202.

The memory 202 is, for example, semiconductor memory, and is configured as including a RAM area and a ROM area. The storage device 203 is, for example, a hard disk, and provides all or apart of the functions of the storage unit 69, or provides all or a part of the functions as the storage area of the data conversion unit 65. The storage device 203 may be semiconductor memory such as flash memory, etc. The storage device 203 may be an external recording device.

The reader 204 accesses an attachable/detachable recording medium 205 at an instruction of the CPU 201. The attachable/detachable recording medium 205 is realized by, for example, a semiconductor device (USB memory etc.), a medium for inputting and outputting information via a magnetic operation (magnetic disk etc.), or a medium for inputting and outputting information via an optical operation (CD-ROM, DVD, etc.).

The communication interface 206 communicates data through a network at an instruction of the CPU 201. The input/output device 207 corresponds to, for example, a device which receives an instruction from a user.

The information processing system for realizing an embodiment is provided for the computer 200 in, for example, the following modes.
(1) Installed in advance in the storage device 203.
(2) Provided by the attachable/detachable recording medium 205.
(3) Provided by a program server.

The information processing method for realizing an embodiment may provide a process of the above-mentioned flowchart by using a plurality of computers. In this case, a computer may request another computer through a network to perform a part of the processes of the above-mentioned flowchart, and receive a process result.

Furthermore, a part of the information processing system according to the embodiments of the present invention may be realized by hardware. Otherwise, the information processing system according to the embodiments may be realized by a combination of software and hardware.

In the present embodiment, the SDN is used as the configuration of the network which connects the FCMDB 11 with the server 8, but the present invention is not limited to this application. Furthermore, the server 8 may be various devices included in the information processing system 101 such as a storage device, network equipment, etc.

The present embodiment is not limited to the above-mentioned modes for embodying the present invention, but may be configured or embodied within the scope of the gist of the present embodiment.

According to the information processing system according to the present embodiment, an update instruction for an information processing device is detected to update the information about an FCMDB.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a first information processing device which is an element of an information processing system;
   a second information processing device which stores integral information obtained by integrating information about the information processing device expressed as component information of the information processing system;
   a relay device which relays a communication between a terminal and the first information processing device, wherein the relay device receives first communication information including an update command for updating of the component information transmitted from the terminal and addressed to the first information processing device, replicates the update command included in the first communication information, generates second communication information including the replicated update command, transfers the first communication information to the first information processing device, and transmits the second communication information; and a control device, to which the second communication information is transmitted, which updates the integral information based on the replicated update command included in the second communication information.

2. The information processing system according to claim 1, the information processing system further comprising: a rule transmission unit which transmits to the relay device an update detection rule for judgment by the relay device as to whether or not the first communication information includes the update command, and an operation rule for regulation of an operation of the relay device when it is judged that the first communication information includes the update command, wherein the relay device judges according to the update detection rule whether or not the first communication information includes the update command, and operates according to the operation rule when it is judged that the first communication information includes the update command.

3. The information processing system according to claim 1, wherein when the first communication information is received, the relay device judges whether or not a source of the first communication information is another relay device connected to the local relay device; when the source of the first communication information is not the other relay unit device connected to the local relay device, the relay device judges whether or not the update command is included in the received communication information; and when the received communication information includes an update command, the relay device transmits the first communication information including the update command and the second communication information including the replicated update command.

4. The information processing system according to claim 1, wherein:

the relay device adds transfer completion information indicating that the first communication information is transmitted to the first and second communication information; and when the first or second communication information is received, the relay device judges whether the communication information includes the transfer completion information, and judges based on the judgment result whether or not the received communication information includes the update command.

5. The information processing system according to claim 1, the information processing system further comprising: a conversion unit which receives the second communication information and converts the replicated update command included in the second communication information into a specified format, wherein the control device updates the integral information using the converted update command.

6. The information processing system according to claim 5, wherein the relay device judges whether a destination of the first communication information is the conversion unit when the first communication information is received; when the destination of the first communication information is not the conversion unit, the relay devices judges whether the received communication information includes the update command; when the received communication information includes an update command, the relay device transmits first communication information including the update command and second communication information including the update command.

7. The information processing system according to claim 2, wherein the rule transmission unit assigns to the plurality of relay devices the update detection rule depending on an update command corresponding to the update detection rule.

8. The information processing system according to claim 2, wherein the relay device transfers the subsequently received update command to another relay device connected to the local relay device when the update command is continuously received.

9. A relay device which replays a communication between a terminal and a first information processing device which is an element of an information processing system, the relay device comprising:

a processor that executes a procedure, the procedure including:
receiving first communication information including an update command which updates information about the information processing device expressed as component information of the information processing system transmitted from the terminal and addressed to the first information processing device,
replicating the update command included in the first communication information;
generating second communication information including the replicated update command,
transferring the first communication information to the first information processing device; and
transmitting the second communication information to a control device.

10. An information processing method which is executed by a processor, the information processing method comprising:

by using a relay device which relays a communication between a terminal and a first information processing device which is an element of an information processing system, receiving first communication information including an update command for updating of information about an information processing device expressed as component information of the information processing system transmitted from the terminal and addressed to the first information processing device, replicating the update command included in the first communication information, generating second communication information including the replicated update command, transferring the first communication information to the first information processing device, and transmitting the second communication information to a control device; and by using the control device, receiving the second communication information, and updating integral information obtained by integrating the component information based on the replicated update command included in the second communication information.

11. A non-transitory computer-readable recording medium having stored therein a program for causing a computer to execute a process, the computer relaying a communication between a terminal and a first information processing device which is an element of an information processing system, the process comprising:

receiving first communication information including an update command for updating of information about an information processing device expressed as component information of an information processing system transmitted from the terminal and addressed to the first information processing device; and replicating the update command included in the first communication information;

generating second communication information including the replicated update command;

transferring the first communication information to the first information processing device; and transmitting the second communication information to a control device.

* * * * *